United States Patent
Bender et al.

(10) Patent No.: US 7,147,717 B2
(45) Date of Patent: Dec. 12, 2006

(54) WURSTER FLUID BED COATER WITH AGGLOMERATION ENHANCEMENT SCREEN

(76) Inventors: Martin P. Bender, 1759 Cliffside Ct., Naperville, IL (US) 60565; Donald P. Verbarg, 15625 Lisbon Center Rd., Newark, IL (US) 60541

( * ) Notice: Subject to any disclaimer, the term of this patent is extended or adjusted under 35 U.S.C. 154(b) by 0 days.

(21) Appl. No.: 11/016,502

(22) Filed: Dec. 18, 2004

(65) Prior Publication Data

US 2006/0130748 A1  Jun. 22, 2006

(51) Int. Cl.
*B05C 5/00* (2006.01)
*B05D 1/00* (2006.01)

(52) U.S. Cl. .............. 118/303; 118/DIG. 5; 427/185; 427/213

(58) Field of Classification Search ............... 118/303, 118/62, DIG. 5, 308; 34/565; 427/185, 427/213
See application file for complete search history.

(56) References Cited

U.S. PATENT DOCUMENTS 6,579,365 B1 *  6/2003  Jones et al. ................. 118/303

* cited by examiner

*Primary Examiner*—Chris Fiorilla
*Assistant Examiner*—Yewebdar Tadesse

(57) ABSTRACT

An improved Wurster-type coater including a separator screen located within the Wurster tube in surrounding relationship to the spray nozzle and forming an annular volume through which at least a portion of smaller feed material particles are permitted to preferentially enter the spray pattern before the larger-sized particles can do so, thereby causing the smaller particles to become agglomerated first, resulting in finished product having a more even distribution of particle sizes.

4 Claims, 1 Drawing Sheet

WURSTER FLUID BED COATER WITH AGGLOMERATION ENHANCEMENT SCREEN

BACKGROUND OF THE INVENTION

The present invention relates to an improved method and apparatus for controllably applying a coating to particulate materials in a Wurster-type fluid bed agglomerating coater. The well-known Wurster apparatus and process is used for coating particulate material in a batch fluidized bed dryer. The fluid bed is widely used for drying powders, creating granules, or coating powders or granules of pharmaceutical, food and chemical ingredients. The Wurster process relies upon a continuous gas stream that moves the product (such as granules, beads, pellets, tablets) past one or more spray nozzles for purposes of coating, layering, and ultimately drying the finished product.

Typically, a Wurster apparatus comprises an outer container having one or more internal upwardly-extending cylindrical inner partitions or "Wurster tubes", each suspended over a perforated gas distribution plate or screen which defines the bottom of the outer container. There is a gap between the bottom of the internal partitions and the distribution plate. The gap is adjustable. The internal cylindrical partitions divide the container into upbed regions inside the partitions surrounded by downbed regions outside of the internal partitions. The perforated plate is provided with larger and/or more numerous perforations within the area defined by the "Wurster tubes" for directing gas flow at a relatively higher volume and/or velocity into the upbed region, with the surrounding distribution plate area containing smaller and/or less numerous perforations for directing gas flow into the downbed region at a decreased velocity, thereby creating a recirculating flow within the apparatus which is upward inside of the partition, and downward on the outside of the partition.

Within the upbed region of the "Wurster tubes", the higher velocity gas transports the particles of feed material past one centrally positioned spray nozzle for coating the passing particles of feed material with a coating solution. After passing through the spray, the particles enter a region of lower gas velocity in an expansion chamber portion of the apparatus above the partitions. When the particles have moved high enough in the expansion chamber, the gas velocity is no longer sufficient to support them, allowing them to fall into the downbed region where they return to the bottom of the chamber, pass through the gap at the bottom of the partition, and reenter the higher velocity gas to be repeatedly recirculated past the spray nozzle until they have been coated to the desired finished condition.

Various forms of the Wurster apparatus and process are disclosed in U.S. Pat. Nos. 2,648,609, 2,799,241, 3,089,824, 3,196,827, 3,207,824, and 3,253,944.

Previous patents have acknowledged that agglomeration can take place in a Wurster coater by particles entering into the wet spray region at the tip of the nozzle. Devices have been utilized to prevent particles from getting too close to the nozzle, to minimize the agglomeration that can take place. In most cases, the starting material to be coated consists of a range of particle sizes as some particle size distribution is inherent in the process used to create the material and, thus, contains a small percentage of small particles (fines). In addition, some small particles (fines) are generated in the materials handling steps preceding the Wurster coating process. In either case, small sized particles are generally not desirable. In addition, spray drying of the spray coating solution used in the process can introduce additional fines into the process stream.

Therefore, it is desirable to allow only the fines and smaller particles to agglomerate, and avoid the undesirable agglomeration of the larger particles. In this way the resulting coated product is of a more uniform size.

A DESCRIPTION OF THE PRIOR ART

In the upbed region of a conventional Wurster apparatus, the particulate material is caused to pass closely to the spray nozzle where it receives an application of the coating liquid each time it passes. However, too-close proximity of the material to the spray nozzle can result in undesired agglomeration of the material.

The agglomeration problem has been addressed by other inventors with varying degrees of success. For example, Jones et al. U.S. Pat. Nos. 5,236,503 and 5,437,889 patents disclose a means for shielding the Wurster spray-nozzle so that the flow of particles is intentionally kept away from the spray until the spray has become fully developed. The inventors claim to achieve the desired objective of preventing undesired agglomeration by providing a separate impermeable cylindrical shield with its base abutting the air inflow distribution plate and having an upper edge surrounding and substantially even with the nozzle tip. This impermeable shield or partition is intended to provide a localized annular stream of gas surrounding the nozzle body which is totally particle-free, such that the spray pattern is allowed to develop fully into finely atomized mist containing small droplets before any of the particles come close enough to contact it. The inventors assert that that this provides significant improvements in the ability to coat without unwanted granulation or agglomeration.

Another example is the device disclosed in Jensen U.S. Pat. No. 6,685,775 in which a radial blast of air is used as a shield or diverter for keeping the stream of circulating product physically separated from the developing spray until the spray pattern is fully formed. A hollow sleeve with a circumferential band of air jets surrounds the spray nozzle body and is connected to a source of pressurized air which is forced outwardly so that the velocity of the expelled air pushes the upflowing material away from the atomizing spray nozzle. The force and volume of the air is said to be sufficient to prevent the material from collapsing back inwardly around the nozzle until the material has moved past the spray zone. This device is claimed to increase the effective area of the spray zone so that the spray pattern is allowed to develop more fully, thereby allowing higher spray rates with little or no agglomeration of the product.

The common objective of the foregoing prior art patents is to keep the flow of particles, including the smaller particles or fines, away from the spray zone until the spray pattern is fully developed.

SUMMARY OF THE INVENTION

By the present invention we have achieved more uniform results by adopting an approach opposite to that taught by the previously described prior art, namely, by intentionally permitting smaller particles to enter the still-developing spray before the larger particles, thereby causing them to become agglomerated, with the result that the combined flow becomes more uniform. This, we have found, leads to a more uniform final particle size.

The apparatus of the present invention achieves this objective by intentionally and preferentially allowing the early agglomeration of fines and small particles by providing a separate cylindrical separator screen surrounding the spray nozzle above the distribution plate at the center of each "Wurster tube." The mesh size of the separator screen is selected so as to selectively limit the size characteristics of particles that are allowed to pass through the screen and into contact with the still-incomplete partially formed conical spray zone at the tip of the spray nozzle.

In other words, the separator screen divides the up-bed region into two concentric sub-regions. As particles pass through the gap beneath the partition and enter the up-bed region, the fines and smaller particles are allowed by the separator screen to pass into the inner concentric sub-region. In this small annular volume, into which only the smallest particles can enter, the particles are conveyed upward into the undeveloped, wet, spray zone of the nozzle. There the fines and smaller particles are wetted with enough coating solution so that they will agglomerate (stick together) earlier than the main body of particles which are too large to pass through the separator screen.

Therefore, a primary objective of the present invention is the provision of an improved Wurster process providing an improved and more uniform coating process, particularly with products which, because of the nature of their manufacturing process, or because of size degradation occurring during materials handling, have a range of sizes which includes a significant amount of fines or smaller sizes.

Another object of present invention to provide a permeable porous separator screen for a Wurster apparatus which permits a complete development of the spray pattern by the atomization of the spray liquid, while at the same time allowing fines and smaller particles to enter and be coated ahead of the larger particles.

These and other objectives will become apparent from the following description of the invention.

DETAILED DESCRIPTION OF THE INVENTION

Figure 1:
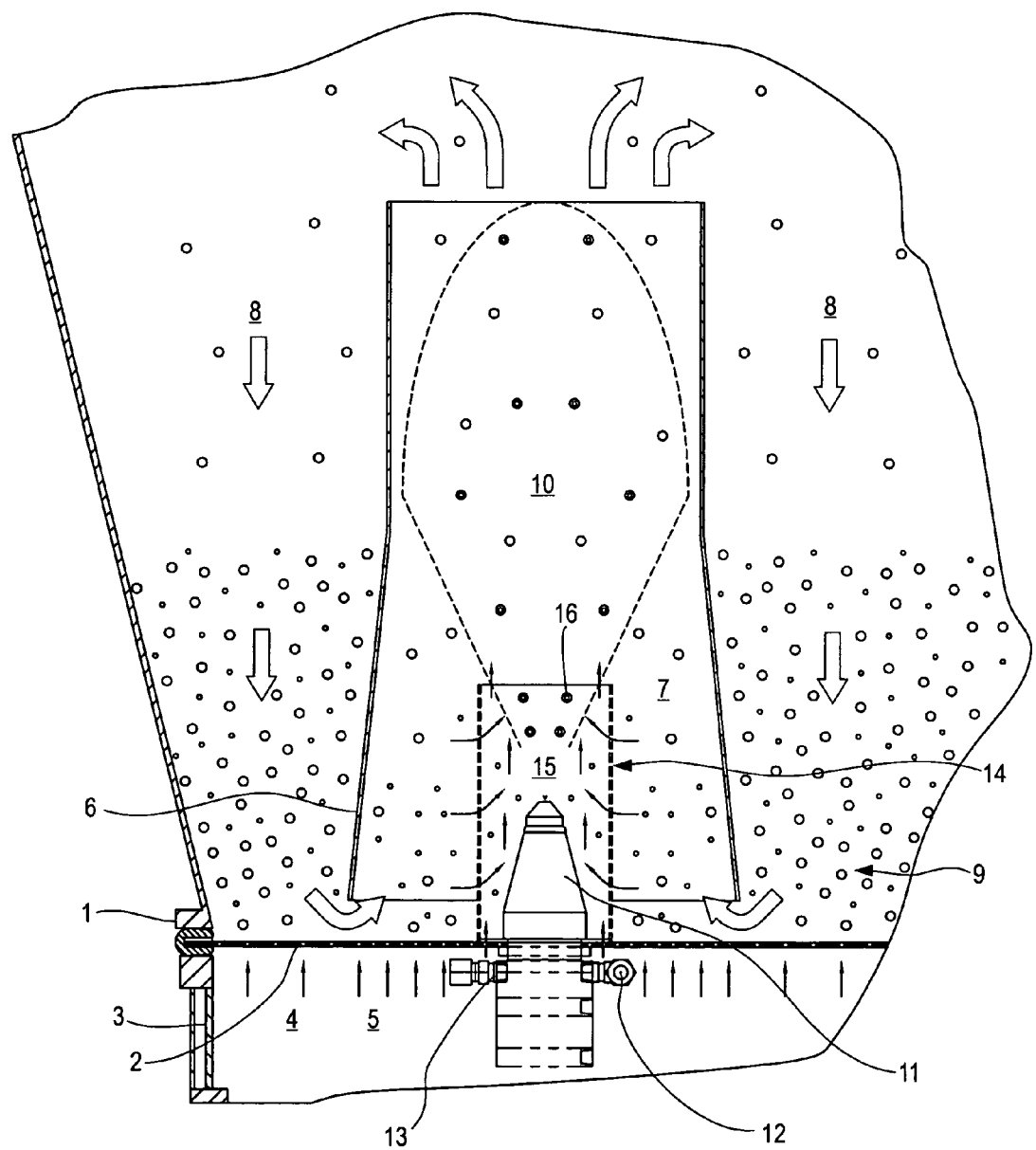
FIG. 1 is a sectional side elevation view of the improved Wurster apparatus of the present invention.

With reference to FIG. 1, a conventional Wurster coater is shown, augmented with the improvements of the present invention. In common with prior art Wurster devices, the fluid bed's coating chamber is at the top by the fluid bed outer shell and filter under which is a bowl or container 1 positioned above a perforated distribution plate or screen 2 resting on a support ring 3 forming a plenum through which a fluidizing stream of gas is passed.

For coating of product, the device is commonly equipped with one or more individual Wurster tubes 6, each of which creates within the bowl 1 an up-bed zone 7 and a down-bed zone 8 surrounding each tube. The distribution plate 2 has fewer or smaller holes in its outer periphery 4 than in its inner portion 5, so that fluidizing gas passes through the inner portion 5 in greater volume and velocity. The hole pattern of the distribution plate 2 is chosen to allow more gas to pass through the inner portion 5 of each tube, thus drawing feed material ingredients 9 descending from the down-bed zone 8 where they are lightly fluidized by the slower-moving outer periphery 4 gas stream and pulled into the faster-moving gas stream of the inner portion 5 and back through the up-bed zone 7.

After the ingredients 9 have flowed under the gap beneath the Wurster tube 6 into the up-bed zone 7, they pass into the fully developed or atomized spray 10 from a spray nozzle 11 into which is pumped a coating liquid from a manifold 12, with the liquid being driven and atomized by a supply of compressed gas flowing through a suitable conduit 13. It should be understood that in practice, a commercial Wurster device might comprise an array of multiple tubes 6, each creating its own separate up-bed above different portions of the distribution plate 2 and sharing a common down-bed.

The foregoing description of the Wurster apparatus is conventional and does not constitute part of the present invention.

According to the invention, instead of keeping all of the particles away from the still-forming spray 16 by use of an impermeable shield (as in Jones U.S. Pat. Nos. 5,236,503 and 5,437,889) or a radially-directed blast of gas (as in Jensen U.S. Pat. No. 6,685,775) a cylindrical separator screen 14 is provided. The separator screen 14 is affixed to either the nozzle 11, the distribution plate 2, or the partition 6 in such a manner as to stand off from the nozzle tip 15, thereby creating an annular volume surrounding the nozzle into which only particles small enough to pass through the separator screen 14 can pass. In this way, only particles smaller than a predetermined size will be able to pass through the separator screen and be propelled upward into the wet, not fully developed region of the spray pattern. In this region they become wetted with the coating solution introduced through the manifold 12 before the remainder of larger particles ever contacts the fully developed portion of the spray 10 and become attached to one another, forming agglomerates 16 which are combined with the larger particles undergoing coating in the fully developed spray pattern. The combined coated granules are subsequently propelled upward and out of the Wurster tube 6 and fall into the down-bed zone, repeatedly circulating down and under the tube 6 for further coating in the fully developed portion of the spray 10.

In practice, the separator screen 14 serves to selectively allow smaller particles (fines) in the flow of material passing beneath the tube 6 to pass through and contact the spray pattern 10 at an earlier point than the larger particles, thereby causing them to agglomerate yielding a flow of more desirable evenly-sized particles requiring fewer passes through the spray area during further processing. This results in a more uniform particle size.

Preferably, the top of the separator screen 14 is positioned to extend in the space above the air distribution plate 2 to just below, but not touching, the spray nozzle spray pattern 10. The optimum size for the openings of the separator screen 14 is dependent upon the ingredients being coated so that only the fines and other particles smaller than the desired size are allowed to pass into the still-developing wet portion of the coating spray adjacent the nozzle tip 15. As these smaller particles are selectively agglomerated in preference to the larger particles, the size distribution of particles within the moving fluidized bed becomes more uniform.

KEY TO REFERENCE NUMERALS

1. Bowl or container
2. Distribution plate or screen
3. Support ring
4. Outer plate periphery
5. Inner plate periphery
6. Wurster tube
7. Up-bed zone 8. Down-bed zone
9. Material ingredients
10. Fully developed spray
11. Spray nozzle
12. Liquid manifold
13. Gas conduit
14. Cylindrical separator screen
15. Nozzle tip
16. Agglomerates

What is claimed is:

1. In a Wurster-type fluidized bed apparatus for applying a coating liquid to a particulate feed material which comprises a distribution of particle sizes including larger particles, smaller particles and fines, said apparatus including a container, a distribution plate, at least one Wurster tube spaced above said distribution plate and defining a central up-bed region and a surrounding peripheral down-bed region, said distribution plate having a plurality of openings, a source of fluidizing gas directed through said distribution plate into said Wurster tube, a source of coating liquid, and a spray nozzle within said at least Wurster tube for directing a spray of coating liquid into said up-bed, whereby said particles are coated by being repeatedly circulated past said spray nozzle, the improvement comprising: a separator screen surrounding said spray nozzle, said separator screen excluding said larger particles while permitting at least a portion of said smaller particles and fines to preferentially pass through said separator screen and into said spray of coating liquid ahead the remaining larger particles, whereby said smaller particles and fines are preferentially agglomerated.

2. The improvement of claim 1 in which said separator screen encloses an annular space around said spray nozzle extending from said distribution plate to just below, but not touching, the spray of coating liquid from said spray nozzle.

3. An improved Wurster-type fluidized bed apparatus for applying a coating liquid to a particulate feed material which comprises a distribution of particle sizes including larger particles, smaller particles and fines, said apparatus including a container, a distribution plate, and a plurality of Wurster tubes each being spaced above said distribution plate and defining a plurality of up-bed regions surrounded by corresponding down-bed regions, said distribution plate having a plurality of openings, a source of fluidizing gas directed through said distribution plate into said Wurster tubes, a source of coating liquid, and a spray nozzle within each said Wurster tube for directing a spray of coating liquid into each said up-bed, whereby said particles are coated by being repeatedly circulated past said spray nozzles, the improvement comprising: a separator screen surrounding said spray nozzle, said separator screen excluding said larger particles while permitting at least a portion of said smaller particles and fines to preferentially pass through said separator screen and into said spray of coating liquid ahead the remaining larger particles, whereby said smaller particles and fines are preferentially agglomerated.

4. The improved apparatus of claim 2 in which each said separator screen encloses an annular space around each said spray nozzle extending from said air distribution plate to just below, but not touching, the spray of coating liquid from each said spray nozzle.

* * * * *